W. TROTTER, Jr.

BOX FOR MATCHES AND OTHER ARTICLES.

No. 9,966. Reissued Dec. 13, 1881.

Witnesses
Just Haynes
Ed Moran

Inventor
Wm Trotter Jun
by his Attorneys
Brown & Brown

N. PETERS, Photo-Lithographer, Washington, D. C.

UNITED STATES PATENT OFFICE.

WILLIAM TROTTER, JR., OF OYSTER BAY, NEW YORK.

BOX FOR MATCHES AND OTHER ARTICLES.

SPECIFICATION forming part of Reissued Letters Patent No. 9,966, dated December 13, 1881.

Original No. 248,236, dated October 11, 1881. Application for reissue filed November 17, 1881.

*To all whom it may concern:*

Be it known that I, WILLIAM TROTTER, Jr., of Oyster Bay, in the county of Queens and State of New York, have invented a certain new and useful Improvement in Boxes for Matches and other Articles, of which the following is a specification.

This invention relates to boxes for matches or other articles which are illuminated by a phosphorescent material or compound for the purpose of enabling them to be visible or distinguishable in a dark room.

The invention is especially applicable to match-boxes, as it facilitates the finding of the matches when it is desired to light the gas or a lamp in a room at night.

The invention consists in a box for matches or other articles, composed of a base-piece, a receptacle or body inserted therein or secured thereon, and provided at the top with an external flange or shoulder, a glass tube or shield fitting outside said receptacle or body, and secured between the base-piece and the flange or shoulder on the receptacle or body, and a coating of luminous paint or compound applied between the receptacle or body and the tube, whereby the tube which is to protect the luminous paint or compound is held in place in a very simple manner, and a box of neat appearance is produced.

Figure 1:
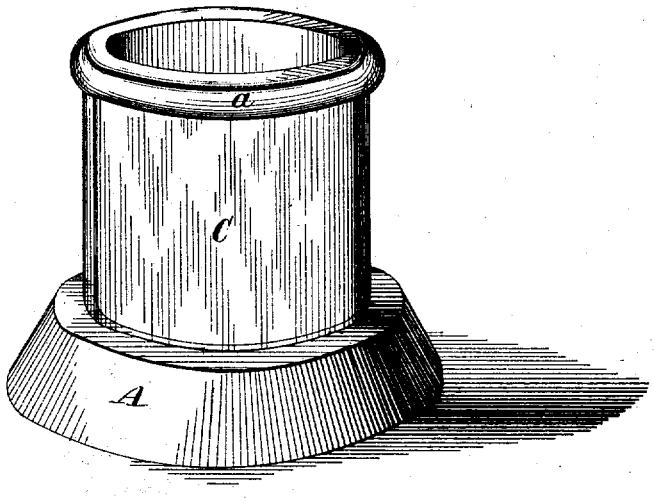
Figure 2:
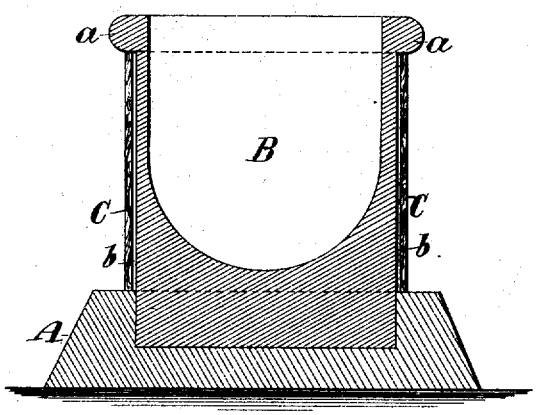

In the accompanying drawings, Figure 1 represents a perspective view of a match-box embodying my invention, and Fig. 2 represents a vertical section thereof.

Similar letters of reference designate corresponding parts in both figures.

A designates a base-piece, which may be made of wood, and may be externally sanded or roughened at some part of its surface to afford a friction-surface for striking matches.

B designates the receptacle or body, which may be made of wood, like the base-piece, or of card-board, or of any other suitable material.

The form of the base-piece and receptacle, as here shown, is cylindric, and the base-piece has in its upper surface a cavity or recess, into which the end of the receptacle or body fits, and wherein it is secured by glue, or in any other suitable manner.

The receptacle or body is furnished at its upper end with an external flange or shoulder, *a*, and between said flange or shoulder and the base-piece is held a glass tube, C, which surrounds the receptacle or body and fits loosely thereon. Thus it will be seen that if the glass tube is slipped over the body or receptacle it is secured by the simple act of securing the receptacle or body in or upon the base-piece.

The luminous or phosphorescent compound, which is in the form of a paint or varnish, is applied in a thin film or coating, *b*, upon the exterior of the receptacle or body; but it might be applied instead to the interior of the glass tube C, and in either case it would be protected by the glass.

The luminous or phosphorescent compound which I propose commonly to employ for this purpose is a paint or varnish composed of sulphide of calcium as a base, and a vehicle consisting of any siccative oils or paint-varnishes; but any other luminous or phosphorescent material or compound may be used.

The luminous or phosphorescent compound, when applied as above described, is protected by the tube C, which constitutes a shield, and will not be worn off or scratched, and I provide for securing the glass tube upon the box in a very simple and effective manner.

If desired, the receptacle or body might be made of glass, and in such case it might be bottomless, and the base-piece be provided with a hub or projection, over which the receptacle or body is slipped, and which forms a bottom therefor.

The shield C, instead of being tubular, may be of taper or other form.

I do not here broadly claim a match-box or safe provided with an exposed tablet of glass behind which is placed a phosphorescent compound to make the box or safe luminous in the dark.

What I claim as my invention, and desire to secure by Letters Patent, is—

A box for matches and other articles, combining in its structure a base-piece, an upright receptacle or body secured thereto, and provided at its top portion with a lateral flange or shoulder and an open mouth for the insertion and removal of the articles, a glass tube inclosing the receptacle or body, and secured between the base-piece and the flange or shoulder at the top of the receptacle, and a coating of luminous or phosphorescent paint or compound applied between the receptacle and the glass tube, all substantially as and for the purpose described.

WM. TROTTER, JR.

Witnesses:

FREDK. HAYNES,

ED. MORAN.